United States Patent [19]

Goch

[11] Patent Number: 5,637,827

[45] Date of Patent: Jun. 10, 1997

[54] INSULATOR WITH INTERNAL PASSAGEWAY

[75] Inventor: Waymon P. Goch, Clinton Summit, Ohio

[73] Assignee: Hubbell Incorporated, Orange, Conn.

[21] Appl. No.: 305,805

[22] Filed: Sep. 13, 1994

Related U.S. Application Data

[63] Continuation of Ser. No. 897,949, Jun. 15, 1992, abandoned.

[51] Int. Cl.$^6$ ................................................. H01B 17/34
[52] U.S. Cl. .......................... 174/30; 174/15.3; 174/158 R
[58] Field of Search ............................. 174/30, 30 R, 174/15.1, 15.3, 11 BH, 12 BH, 14 BH, 139, 158 R, 179, 141 R, 150, 209

[56] References Cited

U.S. PATENT DOCUMENTS

| | | | |
|---|---|---|---|
| 3,735,019 | 5/1973 | Hess et al. | 174/31 R |
| 3,898,372 | 8/1975 | Kalb | 174/179 |
| 3,999,002 | 12/1976 | Rasquin | 174/15.3 |
| 4,212,696 | 7/1980 | Lusk et al. | 174/179 X |
| 4,358,631 | 11/1982 | Matsuda | 174/15 BH |
| 4,427,843 | 1/1984 | Ishihaka et al. | 174/140 S |
| 4,610,033 | 9/1986 | Fox | 174/179 X |
| 4,833,278 | 5/1989 | Lambeth | 174/139 |

FOREIGN PATENT DOCUMENTS

| | | | |
|---|---|---|---|
| 0067568 | 12/1982 | European Pat. Off. . | |
| 0147978 | 7/1985 | European Pat. Off. . | |
| 0704025 | 2/1941 | Germany | 174/30 |
| 2901872 | 7/1980 | Germany . | |
| 3544142 | 6/1986 | Germany . | |
| 49-28637 | 8/1974 | Japan . | |
| 0137693 | 10/1979 | Japan | 174/15.1 |
| 1289025 | 11/1989 | Japan . | |
| 1328850 | 8/1987 | U.S.S.R. . | |
| 1182045 | 2/1970 | United Kingdom | 174/179 |
| 9306471 | 4/1993 | WIPO . | |

*Primary Examiner*—Hyung S. Sough
*Attorney, Agent, or Firm*—Jerry M. Presson; Mark S. Bicks

[57] ABSTRACT

An insulator conveys cooling fluid for or connects an optical fiber cable to an outdoor high voltage electrical system. The insulator includes an elongated pipe of non-conductive material having an internal passageway through it for the cooling fluid or optical fiber cable. An elongated weather-shed housing surrounds and covers the outer surface of the pipe. Couplers, located at the opposite ends of the pipe connect conduits for conveying cooling fluid into and out of the fluid passageway or passing the cable. The insulator can be connected between an electrical device and a heat exchanger through connectors such that cooling medium can pass from the heat exchanger at ground potential up through the insulator which also supports the device and into the device for cooling the device.

23 Claims, 3 Drawing Sheets

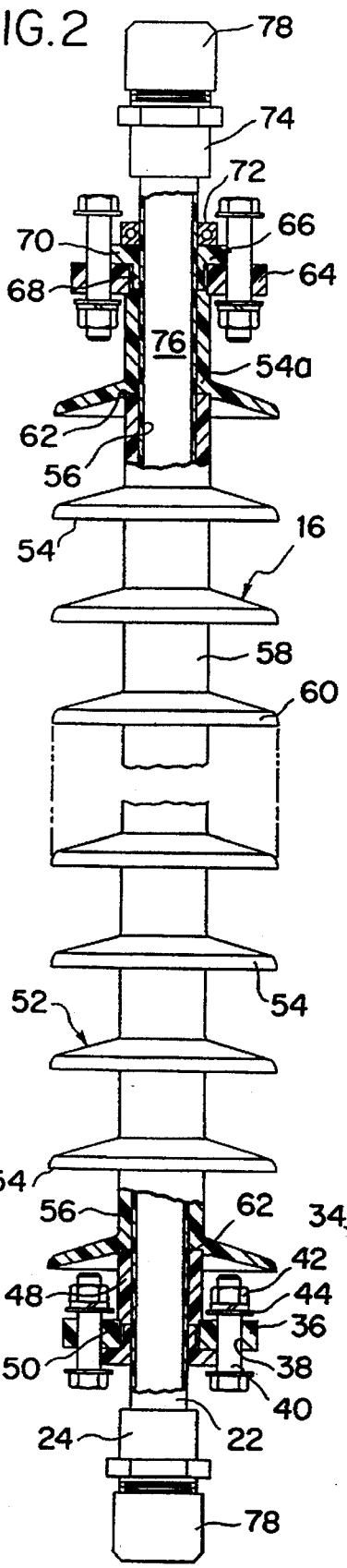
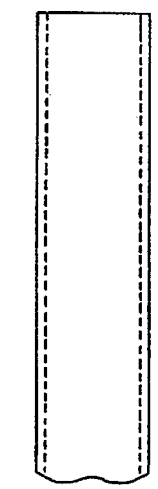
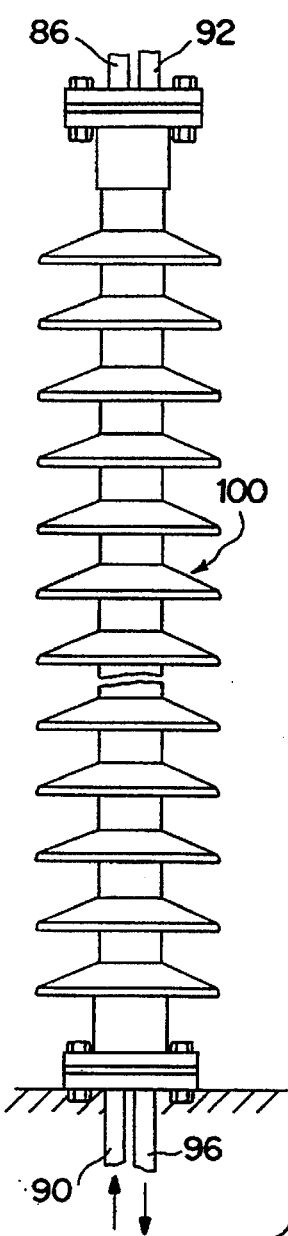

INSULATOR WITH INTERNAL PASSAGEWAY

This is a continuation of application Ser. No. 07/897,949 filed Jun. 15, 1992, now abandoned.

FIELD OF THE INVENTION

The present invention relates to an insulator for outdoor high voltage systems which has an internal passageway for conveying cooling fluid through the insulator to the electrical device to cool the electrical device or for receiving an optical fiber cable. Additionally the present invention relates to a cooling system for high voltage electrical apparatus having a non-conductive support including that insulator with an internal passageway for conveying cooling fluid.

BACKGROUND OF THE INVENTION

Insulators are commonly employed for supporting high voltage electrical components and maintaining those components in a spaced relationship relative to other structures and the ground. The supporting structures are normally maintained at or very close to ground potential. For special applications, the supporting structures may be energized at a higher electrical potential. One insulator is disclosed in U.S. Pat. No. 3,898,372 to Kalb. This insulator includes a central rod of insulating material, such as fiberglass. The ends of the rod include coupling members for attaching the rod to transmission lines and other components and to supporting structures. The rod is surrounded by a series of weathersheds of a rubber-like polymeric material, for example, EPM. The weathersheds are placed end to end along the rod to form a long external surface path. A dielectric material fills spaces between the weathersheds and the insulator central rod to fill any voids between the rod and the weathersheds and to exclude contaminants and moisture which might otherwise form a conductive path. Another insulator is disclosed in U.S. Pat. No. 4,610,033 to Fox. This insulator provides a channel for an optical fiber extending through the insulator between housings at opposite ends of the weathersheds. The optical fiber or fibers can form a communication path between a sensor on an electrical device and a ground location, or form a communication link between two ground locations with a fiber extending along a transmission line. The optical fiber is positioned in an open groove in a support rod of the insulator, such that the optical fiber is exposed to and susceptible to damage and cannot be repaired without replacing the entire insulator.

While these insulators are effective for their intended purposes, they do not satisfy all operational requirements. Specifically, these known insulators cannot work effectively where forced cooling is desired or necessary.

The power handling capacity of high voltage electrical equipment is usually limited by the operating temperature of the conductors and dielectric materials of the apparatus. Power ratings can often be increased significantly by cooling critical components. Closed path circulating liquid cooling systems are particularly effective, although open path cooling systems can also be used.

Thus, a need has developed for providing forced cooling systems conveying cooling fluid for outdoor high voltage electrical equipment. Additionally, a need has developed for an insulator with an optical fiber channel which better protects and permits replacement or repair of the optical fiber.

SUMMARY OF THE INVENTION

An object of the present invention is to provide an insulator with an internal passageway for conveying cooling fluid or receiving an optical fiber for outdoor high voltage electrical systems which is effective, rugged and simple and inexpensive to manufacture.

Another object of the present invention is to provide an insulator with weathersheds which provides a path for circulating dielectric cooling fluid, with the fluid being used to transfer heat generated by energized electrical equipment to cool that equipment and increase its power handing capacity.

The further object of the present invention is to provide a cooling system for high voltage electrical apparatus which is of rugged construction, simple and inexpensive to manufacture and install, and which provides a secure and safe structure to the protect the electrical apparatus.

The foregoing objects are obtained by an insulator for conveying cooling fluid for outdoor high voltage electrical systems comprising an elongated pipe of non-conductive material, an elongated weathershed housing surrounding and covering the outer surface of the pipe, and coupling means located at the opposite ends of the pipe. The pipe has a fluid passageway extending longitudinally therethrough. The coupling means connect the pipe to conduits for conveying cooling fluid into and out of the fluid passageway.

The foregoing objects are also obtained by a cooling system for a high voltage electrical apparatus. The cooling system comprises an electrical device and a non-conductive support coupled to that electrical device. The electrical device has coolant inlet and outlet ports. The support includes a first insulator having an elongated pipe of non-conductive material with a fluid passageway extending longitudinally through it, an elongated weathershed housing surrounding and covering the outer surface of the pipe, and inlet and outlet coupling means located at opposite ends of the pipe for conveying fluid into and out of the passageway. A first connector means connects the electrical device inlet port to the outlet coupling means of the insulator, while a second connector means connects the insulator inlet coupling means to a heat exchanger at ground potential.

In this manner, the insulator can convey forced cooling media through it to and/or from the electrical device to cool the electrical device. The insulator, and the system including the insulator, can convey a cooling medium, particularly a liquid flow to and from the a high voltage potential to a ground potential while it is electrically insulated and protected from exposure to the outdoor environment.

The foregoing objects are additionally obtained by an insulator for outdoor high voltage electrical systems, comprising an elongated, nonconductive rod with a longitudinally extending groove in the outer surface of the rod. An elongated, hollow pipe is secured in the groove and defines a passageway therethrough. An elongated weathershed housing surrounds and covers the rod and the pipe. Coupling means are located at opposite ends of the pipe. The passageway can convey a cooling fluid or receive an optical fiber.

Other objects, advantages and salient features of the present invention will become apparent from the following detailed description, which, taken in conjunction with the annexed drawings discloses preferred embodiments of the present invention.

BRIEF DESCRIPTION OF THE DRAWINGS

Referring to the drawings which form a part of this disclosure:

FIG. 2 is a partial, side elevational view, partially in section of an insulator of the cooling system of FIG. 1;

FIG. 3 is an enlarged, partial side elevational view, partially in section of a pipe for the insulator of FIG. 2;

FIG. 4 is a partial side elevational view of an insulator according to a second embodiment of the present invention;

DETAILED DESCRIPTION OF THE INVENTION

Figure 1:
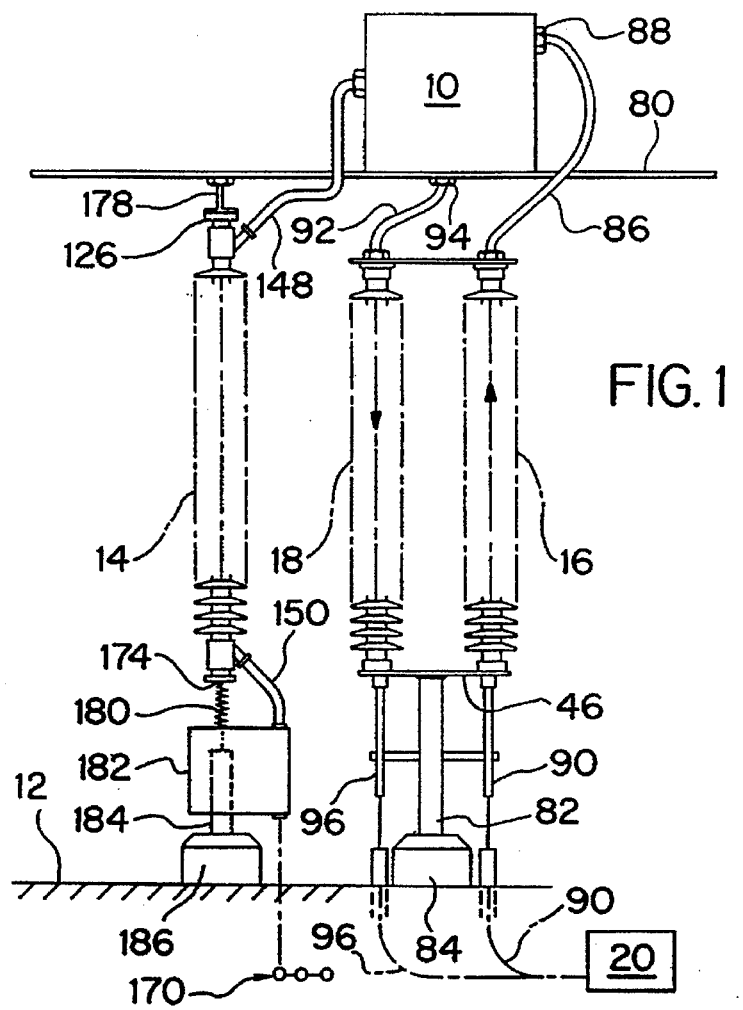
FIG. 1 is a side elevational view diagrammatically illustrating a high voltage electrical equipment installation with forced cooling according to the present invention.

Referring initially to FIG. 1, the present invention is illustrated in a high voltage electrical installation or system. In the exemplary installation illustrated, the electrical device 10 to be cooled is a series compensation capacitor bank of the type used in high voltage transmission lines to compensate for inductance.

The device is supported above ground 12 by suitable conventional insulators (not shown). Three insulators 14, 16, and 18 are mechanically and electrically attached to the energized platform for device 10. Insulator 14 includes fiber optic cables passing therethrough, and can be of the type disclosed in U.S. Pat. No. 4,610,033 to Fox, entitled Insulator with Fiber Optic Communication Channel and issued Sep. 2, 1986, the subject matter of which patent is incorporated herein by reference. Alternatively, insulator 14 can be of the type described hereinafter in connection with FIGS. 6 and 7.

Insulators 16 and 18 are identical and provide parallel cooling paths forming portions of the closed circuit liquid cooling path. Insulator 16 conveys cooling fluid to the electrical device from heat exchanger 20, while insulator 18 conveys cooling fluid from the device back to the heat exchanger.

Since insulators 16 and 18 are identical, only one will be described in detail. Referring now to FIGS. 2 and 3, insulator 16 is shown in its condition during shipment prior to being assembled in the high voltage electrical installation, such as that shown in FIG. 1. The insulator according to the first embodiment illustrated in FIGS. 2 and 3 comprises a hollow right circular cylindrical pipe 22 of non-conductive plastic material. The non-conductive plastic material is preferably high density polypropylene or PVDF (polyvinylidene fluoride). A male adapter fitting or coupling 24 is fusion welded to the lower end of pipe 22 by welds 26. Coupling 24 has a hollow interior and is in fluid communication with the hollow interior of pipe 22 forming the cooling fluid passageway. The end of the coupling remote from the pipe is threaded on its exterior surface for connection to a conduit.

A stub end fitting 28 is secured to the exterior surface adjacent to, but spaced from, male coupling 24. The stub end fitting is secured to the pipe by welds 30. Stub end fitting 28 has a right circular cylindrical portion 32 which extends upwardly along the longitudinal axis of pipe 22 and a radially outwardly extending annular flange portion 34 at the lower end of cylindrical portion 32.

An annular backing ring 36 is slipped over the upper end of pipe 22, as illustrated in FIGS. 2 and 3, until it rests upon stub end fitting 28. Flange portion 34 underlies the backing ring. Cylindrical portion 32 extends through the central opening in the backing ring with some play to permit relative rotation therebetween.

A plurality of holes 38 extend parallel to, but spaced from, the longitudinal axis of the backing ring. Holes 38 receive bolts 40. In combination with nuts 42 and washers 44, bolts 40 fixedly couple the lower end of insulator 16 to a support plate 46 (see FIG. 1).

After backing ring 36 is engaged upon stub end fitting 28, a generally right circular cylindrical end shank 48 is slid over the upper pipe end and down onto the backing ring and the stub end fitting. The lower end portion 50 of end shank 48 has a reduced diameter such that its thickness is substantially equal to cylindrical portion 32 of stub end fitting 28. The height of lower end portion 50 is substantially equal to the difference in heights of backing ring 36 and cylindrical portion 32, such that the shoulder formed by the upper end of lower end portion 50 abuts the upper surface of the backing ring, while the lower most surface of the end shank abuts the uppermost end surface of the stub end fitting. In this matter, the backing ring can be rotated to a desired orientation to align holes 38 with a corresponding set of holes for bolts 40 in support plate 46, but can be frictionally retained and sealed in the desired position by the pressure applied by the stub end fitting and the end shank.

An elongated weathershed housing 52 surrounds and covers the outer surface of pipe 22. Housing 52 is made up of individual weathersheds 54. In the illustrated insulator, 35 weathersheds are employed over the pipe to form the weathershed housing. The actual number of weathersheds employed is determined by the system voltage and environmental conditions.

Each weathershed 54 is formed of elastomeric material preferably, rubber-like polymeric material known as ESP, a silicone/ethylene propylene alloy. Each unstressed weathershed has an internal longitudinal bore 56 which has an internal diameter less than the external diameter of pipe 22. The weathersheds form an interference fit with the pipe outer surface when mounted on the pipe.

Each of the weathersheds 54 has a cylindrical portion 58 and a skirt portion 60. The lowest surface of the skirt portion has a recess 62 for receiving the upper end of the cylindrical portion of the individual weathershed located immediately below it. This engagement of the weathershed provides an overlapping relationship enhancing the integrity of the weathershed housing 52.

Prior to mounting weathersheds 54 on pipe 22, the outer surface of pipe 22 is provided with a light coat of filled silicone dielectric compound. The light coating of compound facilitates mounting and eliminates any voids which may exist between the pipe outer surface and the inner surface of the weathersheds.

A second backing ring 64 is mounted on the upper end of the stack of weathersheds. Ring 64 is formed identically to backing ring 36, and thus, will not be described in detail. Similar features are noted with the same reference numerals.

All of the weathersheds are substantially identical except for the uppermost weathershed 54a. Weathershed 54a has a reduced upper end providing a radially extending shoulder for supporting and sealing the lower surface of second backing rings 64. The recess 62 in the lower surface of the lower most weathershed 54 receives the upper end of end shank 48.

A second stub end fitting 66 is slid on pipe 22 above second backing ring 64. Although identical in construction to end stub fitting 28 in having a cylindrical portion 68 and flange portion 70, stub end fitting 66 is not necessarily welded or otherwise fixed directly to the pipe. Instead, stub end fitting 66 is slidable relative to the pipe.

A clamp collar 72 of conventional design is mounted on pipe 22 immediately above second stub end fitting 66. The clamp collar is pressed downwardly on the structure between the clamp collar and stub end fitting 28 to compress the weathersheds the proper amount and maintain the weathershed seals. The clamp collar is then tightened onto the pipe to fix it in this set position. In this manner, stub end fitting 66, backing ring 64, weathersheds 54 and 54a, end shank 48, and backing ring 36 are placed in axial compression and retained in position.

A second male coupling 74, identical to male coupling 24, is mounted and welded on the upper end of the pipe. Pipe 22, with couplings 24 and 74, provide a continuous fluid passageway 76 extending longitudinally through the insulator pipe and couplings. Couplings 24 and 74 located at the opposite ends of pipe 22 permit conduits to be connected to the pipe for conveying cooling fluid into and out of the fluid passageway. To prevent contamination of the insulator interior during shipment, pipe caps 78 are mounted on the open ends of coupling 24 and 74.

As illustrated in FIG. 1, insulators 16 and 18 are mounted in parallel between the energized platform 80 and the ground end support plate 46. Support plate 46 is supported on ground 12 by a support post 82 and a base 84. The insulators are coupled to a platform and to support plate 46 using bolts 40, nuts 42 and washers 44 coupled to backing rings 36 and 64.

Suitable connectors or conduits are then coupled to the male couplings of the insulators to form a closed circuit fluid path between and including device 10 and heat exchanger 20. Specifically, connector 86 couples electrical device inlet port 88 to upper male coupling 74 of insulator 16, which male coupling forms the outlet coupling of insulator 16. Connector 90 couples the lower male coupling 24 of insulator 16, forming the inlet coupling of insulator 16 to heat exchanger 20 located at ground potential. Connector 92 couples the electrical device outlet port 94 to the upper male coupling 74 of insulator 18 forming the inlet coupling of insulator 18. Connector 96 connects the lower male coupling 24 of insulator 18, forming the outlet coupling of insulator 18, to couple insulator 18 to the inlet of heat exchanger 20. Such connection completes the closed path circuit for the cooling medium.

In operating the cooling system, low temperature cooling fluid is conveyed from heat exchanger 20 through connector 90, up through insulator 16, into connector 86 and finally into inlet port 88. From inlet port 88, the cooling medium is conveyed through appropriate channels within the device to cool the device. After completing its circuit through the device 10, the cooling medium exits through outlet port 94, passes through connect 92, through the interior of insulator 18 and through connector 96 back to heat exchanger 20 for cooling and recirculation.

With the embodiment disclosed in FIGS. 1–3, two insulators are required, one for flow from the heat exchanger and one for flow to the heat exchanger. With the alternative second embodiment of the invention illustrated in FIGS. 4 and 5, the two insulators of FIG. 1 can be replaced by a single insulator 100, and still provide the complete closed circuit path for the cooling medium.

Figure 5:
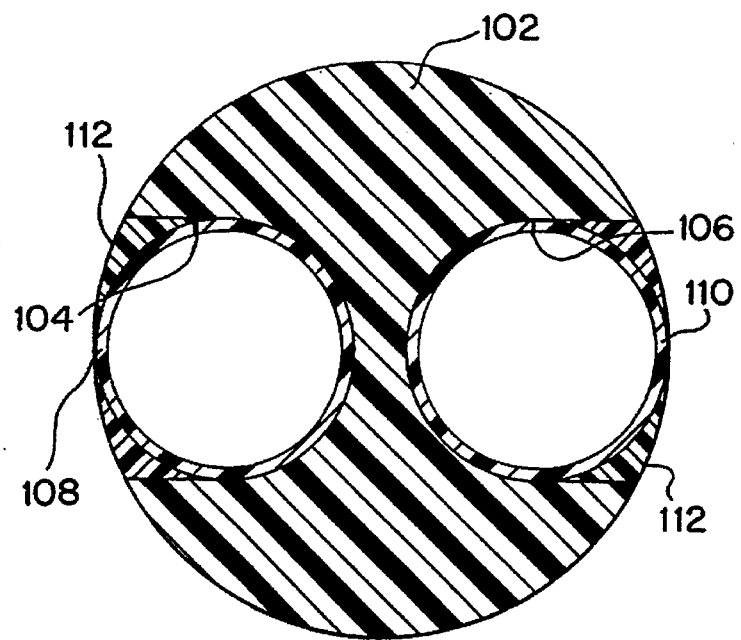
FIG. 5 is a plan view in transverse cross section of the insulator of FIG. 4.

In the embodiment of FIGS. 4 and 5, the construction is identical except for the configuration of the pipe. Only the differences will be described in detail with references to identical parts being identified with the same number. In insulator 100, pipe 22 is omitted and replaced by a structure which provides two parallel but independent passageways for the cooling medium. Specifically, the axial center of insulator 100 comprises a right circular cylindrical fiberglass rod 102. Diametrically opposite portions of rod 102 define recesses 104 and 106 which extend longitudinally through the rod along its entire length, but spaced laterally from its longitudinal axis. Recesses 104 and 106 are parallel to the longitudinal axis. Recess 104 receives a hollow, right circular cylindrical pipe 108, while recess 106 receives a hollow, right circular cylindrical pipe 110. The spaces between right circular cylindrical shape of rod 102 and pipes 108 and 110 is filled with silicone dielectric compound 112.

The opposite ends of pipes 108 and 110 can be coupled to the connectors 86, 90, 92 and 96 similar to that illustrated for insulators 16 and 18 in FIG. 1. In this manner, a single insulator can provide the independent fluid flow to and from the electrical device and heat exchanger.

Figures 6, 7:
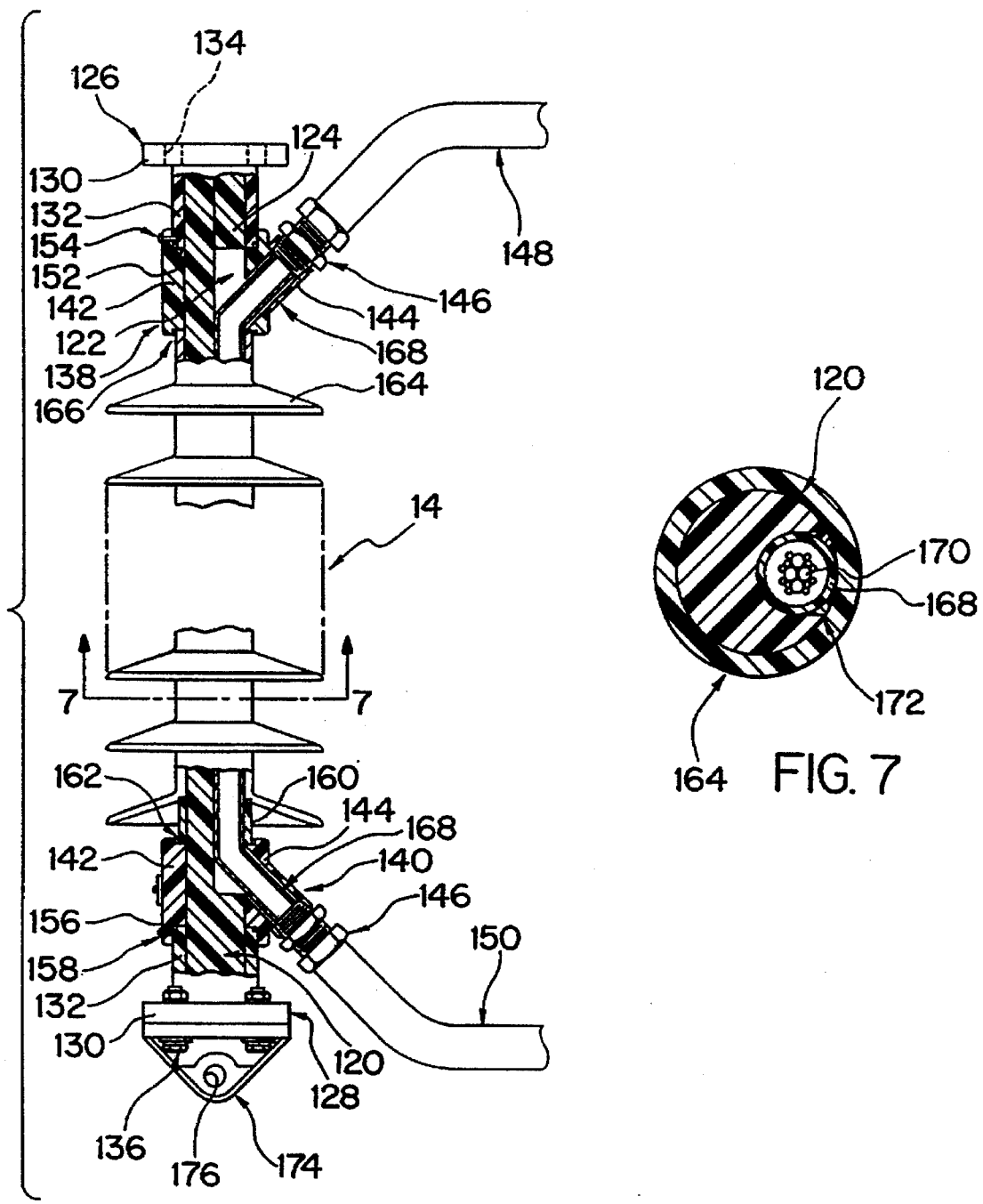
FIG. 6 is a partial, side elevational view, partially in section of an insulator forming a conduit for an optical fiber cable according to the present invention, but without the cable.
FIG. 7 is a plan view in section of an insulator taken along line 7—7 of FIG. 6.

The details of insulator 14 are illustrated in FIGS. 6 and 7. Insulator 14 comprises a central support rod 120 of fiberglass material. The rod includes a longitudinally extending groove 122 extending along a substantial portion of its length and opening laterally outwardly on the outer surface of rod 120. The groove opens axially through the rod upper end, but terminates short of the rod lower end, in the orientation depicted in FIG. 6. The upper end of the groove is closed by a cylindrical rod 124 which can be fiberglass or other materials such as metal. Rod 124 prevents collapse of the groove and other rod damage during crimping.

Mounted on the opposite axial ends of support rod 120 are post caps 126 and 128. The post caps are fixed to the support rod by swaging or crimping. Each post cap prizes a circular plate 130 and a hollow cylindrical portion 132. The hollow cylindrical portions receive the opposite ends of support rod 120, with the end faces of the support rod engaging the inner surfaces of plates 130. Plates 130 have holes 134. Holes 134 receive bolts 136 which secure the plates to other structures with nuts and washers.

Lateral assemblies 138 and 140 are mounted on the exterior surface of support rod 120 adjacent post caps 126 and 128, respectively. Each lateral assembly is substantially identical. Each lateral assembly includes a cylindrical part 142 which surrounds support rod 120 and a branch part 144 which extends from the cylindrical part at an acute angle to the longitudinal axis of the cylindrical part and of the support rod. Both parts of each lateral assembly are hollow. The free ends of each branch are formed with conduit connectors 146 for securing conduits 148 and 150 to the lateral assemblies.

The opposite ends of each lateral assembly are provided with recesses adjacent its inner diameter which open in an axial or longitudinal direction. The upper recess of lateral assembly 138 receives the lower end of post cap 126. Adhesive sealant 152 and screws 154 fix and seal post cap 126 to lateral assembly 138. Similarly, the upper end of post cap 128 is received in the recess in the lower end of lateral assembly 140 and is secured and sealed thereto by adhesive sealant 156 and screws 158.

An end shank 160 is mounted about support rod 120 above lateral assembly 140. End shank 160 is in the shape of a right circular cylinder with its lower end received in the recess in the upper end of lateral assembly 140. Adhesive sealant 162 fixes and seals end shank 160 to lateral assembly 140.

A plurality of weathersheds 164 are mounted on the exterior surface of support rod 120 between end shank 160 and lateral assembly 138. The illustrated installation includes twenty-three weathersheds, with the actual number being dependent upon system voltage and the environment. The weathersheds are made of the same material and configured in the same manner as weathersheds 54 of insulators 16 and 18, and similarly form a weathershed housing for insulator 14. The uppermost weathershed 64 is fixed and sealed to lateral assembly 138 by adhesive sealant 166. Silicone dielectric compound is provided between the support rod and the weathersheds to facilitate assembly and fill any voids which may exist therebetween.

A hollow plastic tube 168 is located within groove 122 of support rod 120 and within branches 144 of lateral assemblies 138 and 140. Preferably, the tube is formed of a vinyl compound of the type sold under the trademark TYGON by U.S. Stoneware Company of Akron, Ohio. The plastic tube forms a continuous conduit for a multiple optical fiber cable 170 which extends through plastic tube 168 and conduits 148 and 150. Spaces between cable 170 and tube 168 and between tube 168 and weathersheds 164 can be filled with silicone dielectric compound 172 as illustrated in FIG. 7. The cable and silicone dielectric are omitted from the illustration of FIG. 6 for clarity.

By providing plastic tube 168, cable 170 is protected from damage during manufacture and installation. Additionally, the tube permits the cable to be replaced by suitable insertion tools should the cable be damaged or defective.

A clamp support 174 is secured to plate 130 of post cap 128 by bolts 136. Clamp support 174 has a hole 176 extending perpendicular through the clamp support, perpendicular to the longitudinal axis of support rod 120.

Insulator 14 is mounted as illustrated in FIG. 1. Upper post cap 126 is attached by a bracket 178 to electrical device 10. Spring 180 is coupled in hole 176 of clamp support 174. The lower end of the spring is attached to a lower support post 184. The fiberoptic junction box 182 is supported on ground 12 by support post 184 and a base 186.

In this manner, the optical fiber cable can extend from the ground through insulator 14 and be coupled to electrical device 10 for relaying signals controlling the operation of electrical device 10. With the present invention, relatively large diameter optical fiber cable can be mounted within the dielectric structure of the insulator, while providing access to the cable ends for connection to an optical data link. In this manner, the cable within the dielectric structure of the insulator is isolated from the mechanical structure to avoid attenuation inducing stresses in the optical fibers.

While various embodiments have been chosen to illustrate the invention, it will be understood by those skilled in the art that various changes and modifications can be made therein without departing from the scope of the invention as defined in the appended claims.

What is claimed is:

1. An insulator for conveying cooling fluid for outdoor high voltage electrical systems without flowing electrical current through the cooling fluid, comprising:

an elongated pipe of non-conductive material having a fluid passageway extending longitudinally therethrough and having opposite ends, said pipe including a first radially outwardly extending nonconductive flange located adjacent one of said ends;

an elongated, non-conductive weathershed housing engaging, surrounding and covering an outer surface of said pipe without gaps, said weathershed housing including a plurality of individual abutting weathersheds, said individual weathersheds being axially compressed together;

non-conductive coupling means, located at said opposite ends of said pipe, for connecting conduits for conveying cooling fluid into and out of said fluid passageway; and a nonconductive clamping collar adjustably mounted on said pipe adjacent the other of said ends, said individual weathersheds being located and compressed between said clamping collar and said flange.

2. An insulator according to claim 1 wherein said weathershed housing is formed of elastomeric material and forms an interference fit with said pipe.

3. An insulator according to claim 1 wherein said first flange is fixed to said pipe.

4. An insulator according to claim 3 wherein a second radially outwardly extending non-conductive flange is slidably mounted on said pipe between said clamping collar and said weathershed housing.

5. An insulator according to claim 4 wherein non-conductive backing rings are rotatably mounted on said first and second flanges, and have mounting means for coupling the insulator to supports.

6. An insulator according to claim 5 wherein each of said backing rings is mounted and compressed between one of said flanges and said weathersheds.

7. An insulator according to claim 6 wherein each of said backing rings have mounting means for coupling the insulator to supports.

8. An insulator according to claim 1 wherein said pipe is formed of plastic.

9. An insulator according to claim 1 wherein said pipe comprises a fiberglass rod having two fluid passageways extending longitudinally therethrough.

10. An insulator according to claim 1 wherein said elongated pipe is mounted in a first recess in an elongated fiberglass rod.

11. An insulator according to claim 10 wherein a second pipe is mounted in a second recess in said elongated fiberglass rod.

12. An insulator according to claim 1 wherein each of said weathersheds comprises a generally cylindrical upper end with a generally planar end face and an annular recess with a generally planar end wall on a lower end of each weathershed for receiving an upper end of a weathershed located therebelow, said end faces abutting respective end walls.

13. An insulator according to claim 1 wherein
cooling fluid is received in said fluid passageway without electrical current flowing therethrough.

14. An insulator according to claim 13 wherein said cooling fluid is a liquid.

15. An insulator for conveying cooling fluid for outdoor high voltage electrical systems without flowing electrical current through the cooling fluid, comprising:

an elongated pipe of non-conductive material having a fluid passageway extending longitudinally therethrough;

an elongated, non-conductive weathershed housing engaging, surrounding and covering an outer surface of said pipe without gaps, said weathershed housing including a plurality of individual abutting weathersheds, said individual weathersheds being axially compressed together;

nonconductive coupling means, located at opposite ends of said pipe, for connecting conduits for conveying cooling fluid into and out of said fluid passageway; and nonconductive backing rings coupled to said pipe adjacent said opposite ends, said backing rings having mounting means for coupling the insulator to supports.

16. A cooling system for a high voltage electrical apparatus without flowing electrical current through the cooling fluid, comprising:

an electrical device with coolant inlet and outlet ports;

a non-conductive support coupled to said electrical device, said support including a first insulator, said first insulator having an elongated first pipe of non-conductive material with a first fluid passageway extending longitudinally therethrough and with opposite ends, having an elongated non-conductive weathershed housing engaging, surrounding and covering an outer surface of said first pipe without gaps and having non-conductive first inlet and outlet coupling means located at opposite ends of said pipe for conveying fluid into and out of said first passageway, said pipe including a fixed first radially outwardly extending nonconductive flange located adjacent one of said ends, said weathershed housing including a plurality of individual abutting weathersheds, said individual weathersheds being axially compressed together;

first connector means for connecting said inlet port to said first outlet coupling means;

second connector means for connecting said first inlet coupling means to a heat exchanger at ground potential; and a nonconductive clamping collar adjustably mounted on said pipe adjacent the other of said ends, said individual weathersheds being located and compressed between said clamping collar and said flange.

17. A cooling system according to claim 16 wherein said support comprises a second insulator adjacent and parallel to said first insulator, and said second insulator having an elongated second pipe of non-conductive material with a fluid passageway extending longitudinally therethrough, an elongated non-conductive weathershed housing engaging, surrounding and covering an outer surface of said second pipe without gaps and second non-conductive inlet and outlet coupling means located at opposite ends of said second pipe for conveying fluid into and out of said second passageway;

third connector means connects said outlet port to said second inlet coupling means; and fourth connector means connects said second outlet coupling means to the heat exchanger.

18. A cooling system according to claim 16 wherein said first insulator comprises an elongated fiberglass rod having a second fluid passageway extending longitudinally therethrough and having second inlet and outlet coupling means located at opposite ends of said second passageway for conveying fluid into and out of said second passageway;

third connector means connects said outlet port to said second inlet coupling means; and fourth connector means connects said second outlet coupling means to the heat exchanger.

19. A cooling system according to claim 16 wherein said weathershed housing is formed of elastomeric material and forms an interference fit with said pipe.

20. A cooling system according to claim 12 wherein a second radially outwardly extending non-conductive flange is slidably mounted on said pipe between said clamping collar and said weathershed housing.

21. A cooling system according to claim 20 wherein non-conductive backing rings are rotatably mounted on said first and second flanges, and have mounting means for coupling the insulator to supports.

22. A cooling system respectively according to claim 16 wherein cooling fluid is received in said fluid passageway without electrical current flowing therethrough.

23. A cooling system according to claim 22 wherein said cooling fluid is a liquid.

* * * * *